United States Patent [19]

Alkire et al.

[11] 4,387,317

[45] Jun. 7, 1983

[54] METHOD AND APPARATUS FOR SECURING END WINDING CONDUCTORS

[75] Inventors: Gerald R. Alkire, North Coventry Township, Chester County; George F. Dailey, Plum Borough; Charles E. Kauric, Manor Borough, all of Pa.

[73] Assignee: Westinghouse Electric Corp., Pittsburgh, Pa.

[21] Appl. No.: 260,441

[22] Filed: May 4, 1981

[51] Int. Cl.³ .............................................. H02K 3/46
[52] U.S. Cl. .................................... 310/260; 29/596
[58] Field of Search .................. 310/260, 270; 29/596; 336/197; 174/138 E

[56] References Cited

U.S. PATENT DOCUMENTS 2,994,735  8/1961  Marshall et al. ................. 310/260 X
3,344,297  9/1967  Bishop et al. .
3,949,257  4/1976  Cooper et al. ...................... 310/260
4,283,840  8/1981  Merikallio et al. ............. 310/260 X

FOREIGN PATENT DOCUMENTS 1532913  6/1968  France .
54-8803   1/1979  Japan ................................... 310/260
1110481   4/1968  United Kingdom .

Primary Examiner—John Gonzales
Attorney, Agent, or Firm—William D. Lanyi

[57] ABSTRACT

A method and apparatus for securing end windings of turbine generators is described. The invention comprises a hose and a dry filament subcomposite disposed therein. By choosing suitable proportions of the subcomposite components, the coefficient of thermal expansion of the total hose assembly is preselectable with reasonable accuracy.

23 Claims, 6 Drawing Figures

METHOD AND APPARATUS FOR SECURING END WINDING CONDUCTORS

BACKGROUND AND SUMMARY OF THE INVENTION

The present invention relates to a securing arrangement of conductors and, more particularly, to the rigid securing of the stator coil end windings of turbine generators.

The stator coil end windings of a turbine generator typically extend axially from the stator structure for a significant distance. Since the end winding segment of each conductor is not secured within a stator core slot, as its straight segment is, it is subject to severe vibrations and stresses during operation. These effects can be caused by mechanical vibrations during normal operations or the very large electromagnetic forces which occur during abnormal short-circuit or fault conditions.

Normally, each individual conductor is braced to its associated conductors to form a conically shaped end winding assembly which is coaxial with, and extends axially from, the stator structure. Typical turbine generator designs employ two coaxial stator coil assemblies with the straight segments of an inner assembly being disposed radially inward from the outer assembly in the stator core slots. The end winding segments of the inner coil assembly are associated in a conical shape which is radially inward from, and coaxial with, the similarly associated end winding segments of the outer coil assembly.

Bracing and securing the end winding assemblies is conventionally done with conformable pads or blocks located between various support rings and the conductors or between adjacent conductors. The support rings usually extend around the end winding assemblies and the pads typically consist of a resilient material, such as Dacron felt, impregnated with a resin compound. The impregnated pads are placed between the conductors and support rings, at appropriate places, before the resin is cured.

Since the distance between the conductors and support rings varies, pads of various thickness are required and, occasionally, the padding material must be wrapped around a solid block of non-conductive material to accommodate the larger gaps. This variation of gap distance necessitates a large number of different sized pads and complicates the generator's construction.

Although the pads are compressed during implacement, it is difficult to maintain a satisfactory tightness between the support rings and conductors to keep the conductors tight over long periods of operation. A spacing ring or hoop using similar methods as the conformable spacing member is taught in U.S. Pat. No. 3,344,297 issued Sept. 26, 1967 to Bishop, et al.

A significant improvement over the above mentioned technique is disclosed and claimed in U.S. Pat. No. 3,949,257 issued on Apr. 6, 1976 to Cooper et al. It utilizes a flexible hose which is disposed between the support ring and the conductors, extending substantially around the entire circumference of the support ring and filled with resin, under pressure. As the resin is pumped into the hose, the hose assumes a generally circular cross-section between conductors and a flattened cross-section in its segments which are disposed between the support ring and a conductor. This discontinuity of cross-sectioned shape provides bulges between conductors that aid in the prevention of tangential motion of the individual conductors. Another advantage of this invention is that the hose, as the resin is pumped into it, expands radially as much as possible along its entire length. This behavior tends to fill each gap that exists between the conductors and the support ring to the required extent without the need for the custom fitting that is required by previous methods.

Although significant success has been experienced in the application of the Cooper device, some problems have also been discovered. When the resin is completely cured by the application of heat, the coil end windings, support rings and hoses reach equilibrium temperatures as high as 130° C. Although the entire structure is relatively stress free at this temperature, subsequent cooling to room temperature can produce gaps between the conductors, hoses and support rings due to their different coefficients of thermal expansion. The coefficients of thermal expansion for the rings and coils, measured in inches per inch per degree Centigrade (in/in/° C.), are $6\times10^{-6}$ for the rings and $12\times10^{-6}$ to $18\times10^{-6}$ for the coil assemblies, depending on location. The coefficient for the resin-filled hose of the Cooper device is $44\times10^{-6}$, which accounts for a significant portion of the resultant gaps described above.

Since the coefficient of thermal expansion of the resin-filled hose is a function of the resin composition, a potential solution to the problem was thought to be a resin composition comprising a sufficient proportion of inorganic filler material to reduce the coefficient to a value comparable to that of the coils or rings. This proportion can be calculated to be in the range of 72 to 75 percent of the resin composition. However, this composition becomes a thick paste at room temperature and requires the addition of heat to allow it to be pumped into the hoses. The addition of heat has the deleterious effect of inducing the resin to prematurely cure. Although possible, the success of this method depends on quickly and completely filling the hoses before curing progresses to a point that would prevent the procedure's continuation.

The criticality of time and its resulting uncertainty of success is the primary incentive that induced the present invention which employs a room temperature pumping operation while making possible a reasonably accurate determination of the coefficient of thermal expansion of the resulting resin-filled hose. The method and apparatus of the present invention comprises the insertion of a dry filament subcomposite into the hose prior to its being filled with resin at room temperature followed by a heat curing operation. The coefficient of thermal expansion of the finished hose assembly is determined by the proportions of dry filament materials used and can be varied with reasonable accuracy to produce a filament reinforced, resin-filled hose with a coefficient of thermal expansion comparable to that of the support rings and conductors. The present invention therefore incorporates the advantages of the Cooper hose technique while eliminating its incumbent gap-producing tendencies.

BRIEF DESCRIPTION OF THE DRAWINGS

The present invention will be more fully understood from the following detailed description of the preferred embodiment, read in conjunction with the accompanying figures, in which.

DESCRIPTION OF THE PREFERRED EMBODIMENT

Figure 1:
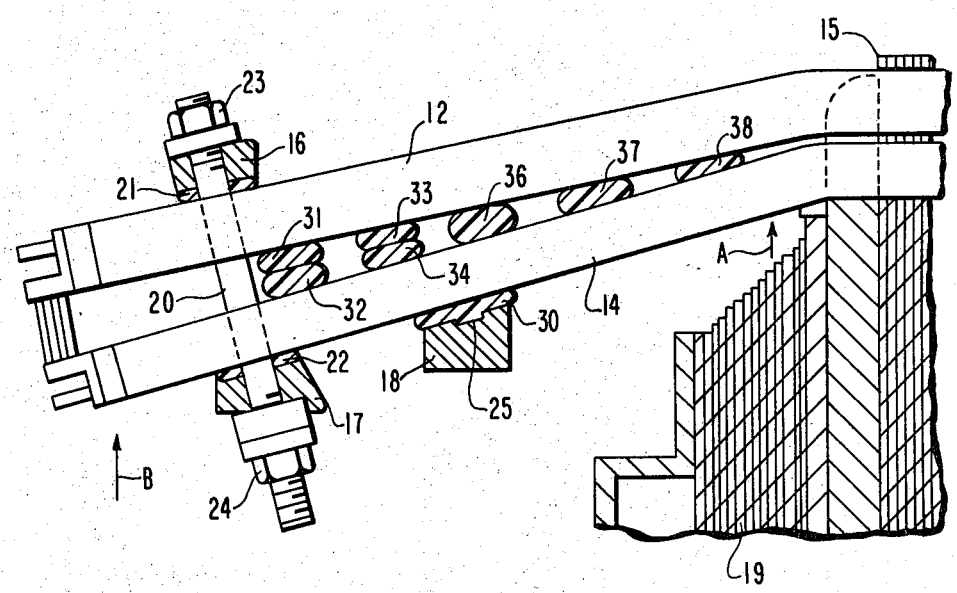
FIG. 1 is a partial view of a turbine generator end winding with an arrangement of the present invention.

The present invention is applicable to the securing of conductors and, more specifically, to the securing of the stator end windings of turbine generators. Throughout the following description, similar reference characters refer to similar elements or members in all of the figures.

Referring now to FIG. 1, a portion of a turbine generator's coil end winding is depicted. Adopting the standard convention whereas the first coil wound into the stator core slot is referred to as the bottom coil and the last coil wound into the stator coil slot is referred to as the top coil, FIG. 1 shows the top coil 12 and bottom coil 14 of a typical turbine generator at the end winding portion of the coil construction where the stator coils extend from the stator core 15 and its associated components 19. Also shown in FIG. 1 are three support rings 16, 17 and 18 with a threaded stud 20 disposed between adjacent top coils and adjacent bottom coils and through the support rings 16 and 17. The stud 20 is used in association with the cushion pads 21 and 22 and the nuts 23 and 24 to provide a securing force that pulls the top 12 and bottom 14 coils together.

Also shown in FIG. 1 is the support ring 18 which serves to exert a radially inward force on the bottom coil 14. Typically, a support ring used in the manner depicted by support ring 18 is physically constrained from moving in a radially outward direction by a support bracket or brace (not shown in FIG. 1). Support ring 18 also illustrates of the use of a circumferential groove 25 which provides an axial securing force when used in conjunction with the present invention, hose 30 in FIG. 1.

The support rings 16, 17 and 18 are constructed of a suitable non-metallic material such as glass-reinforced epoxy resin. They may be positioned radially inward from the end winding (as in support ring 16), radially outward from the end winding (as in support rings 17 and 18) or between the top 12 and bottom 14 coils of the end winding (not shown in FIG. 1).

FIG. 1 also shows the hoses 30, 31, 32, 33 34, 36, 37 and 38 of the present invention. These hoses may be utilized in two basic ways. A hose 30 is shown disposed between a support ring 18 and a coil 14. Alternatively, the hoses 31, 32, 33, 34, 36 and 37 are disposed between the top 12 and bottom 14 coils of the end winding assembly. A hose arrangement for the purpose of securing end winding conductors is disclosed and claimed in U.S. Pat. No. 3,949,257, issued on Apr. 6, 1976 to Cooper et al. Although the Cooper invention is a significant improvement over the prior art, some problems can occur in its use in a turbine generator.

Since the resin-filled hose of the Cooper arrangement has a radial coefficient of thermal expansion of approximately $44 \times 10^{-6}$ in/in/° C. as compared to an average of $15 \times 10^{-6}$ in/in/° C. for the coils, gaps can occur between these components upon cooling from the curing temperature of about 130° C. to room temperature. Further compounding of the problem is caused by the fact that the coil end winding assembly exhibits a non-uniform radial coefficient of thermal expansion that varies from $12 \times 10^{-6}$ in/in/° C. at the end of the stator core (region A in FIG. 1) to $18 \times 10^{-6}$ in/in/° C. in the vicinity of the stud 20 (region B in FIG. 1). It should be readily apparent to those skilled in the art that the difference of coefficients of thermal expansion between the coils and hoses and the varying magnitudes of coefficients of thermal expansion along the coils themselves make it necessary to be able to preselect the coefficient of thermal expansion of each hose for its particular location within the coil and winding assembly.

Figure 2:
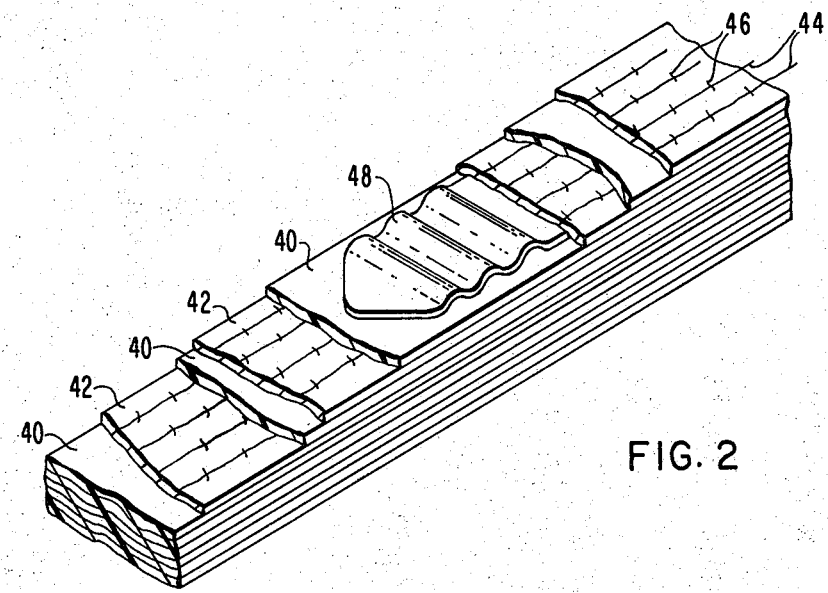
FIG. 2 is a sectional view of the dry filament subcomposite of the present invention which displays its individual subcomponents.

The present invention allows the hoses to be constructed with a predetermined coefficient of thermal expansion and with sufficiently high tensile strength and ductility for use in turbine generator applications. In the present invention, a dry filament subcomposite is inserted into the hose prior to the resin being pumped into it. FIG. 2 shows a section of the dry filament subcomposite.

The dry filament subcomposite, shown in FIG. 2, comprises fiberglass sheets 40, Dacron cross-weave tape 42 and waxed glass cords 44 in alternating layers. The waxed glass cords 44 are sewn to the Dacron cross-weave tape 42 layers with cotton thread 46. Periodically, a ripple spring 48 with a standard sinusoidal shape is included between the layers. Each component of the above-described dry filament subcomposite serves a particular function and their widely varying coefficients of thermal expansion allow the coefficient of thermal expansion of the final assembly to be preselected with relative accuracy by choosing the proportions of the components properly.

The Dacron tape 42 has a coefficient of thermal expansion of approximately $25 \times 10^{-6}$ in/in/° C. and provides the subcomposite with a high degree of ductility. The waxed glass cords 44 are assembled into the subcomposite with the Dacron tape 42. For ease of assembly, the cords 44 are sewn to the tape 42 with cotton thread 46. The cords 44, although having only a slight effect on the overall coefficient of thermal expansion, do increase its ductility. The cords 44 also serve the important function of creating axial channels between adjacent layers of filament through which resin can flow. These channels allow the resin to be uniformly distributed throughout the dry filament subcomposite.

The fiberglass sheets 40 have a very low coefficient of thermal expansion of about $6 \times 10^{-6}$ in/in/° C. This attribute, along with a high tensile strength, allows the coefficient of thermal expansion of the entire hose assembly to be significantly reduced without sacrificing tensile strength.

The ripple spring 48 creates channels that run perpendicular to the channels created by the waxed glass cords 44. These channels allow resin to flow into the dry filament subcomposite and improve the distribution of resin throughout the entire hose structure. The spring 48 also exerts a force which is perpendicular to the surfaces of the tape 42 and fiberglass sheets 40. This force tends to maintain the thickness of the subcomposite when compression forces are exerted on it that would normally cause it to be flattened. This attribute will be discussed further in the description of the assembly of the hose into the generator, below.

It should be obvious to those skilled in the art that, by controlling the proportions of the Dacron tape 42 (coefficient=$25\times10^{-6}$), fiberglass sheet 40 (coefficient=$6\times10^{-6}$) and resin (coefficient=$42\times10^{-6}$), the coefficient of thermal expansion of the finished hose assembly can be preselected with reasonable accuracy within the range of $6\times10^{-6}$ in/in/° C. to $42\times10^{-6}$ in/in/° C. It should further be apparent that hose assemblies requiring very low thermal coefficients will have very high amounts of fiberglass sheet and vice versa.

Figure 3:
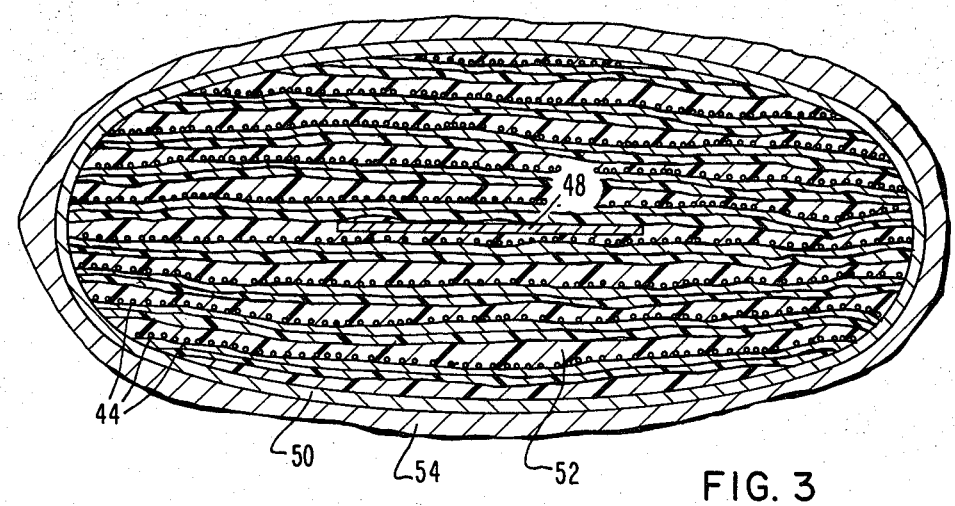
FIG. 3 is a cross-sectional view of the present invention after the resin has been cured.

FIG. 3 shows a cross-section view of a hose assembly after insertion of the dry filament subcomposite and the filling with resin. Clearly visible are the cross-sections of a ripple spring 48 and a plurality of waxed glass cords 44. Uniformly distributed within the hose 50 are the resin-soaked fibers 52 of Dacron tape and fiberglass sheet.

Surrounding the external surface of the hose 50 is a coating 54 of Dacron felt impregnated with a B-stage epoxy resin. This coating 54 facilitates assembly into the turbine generator and provides a bond between the hose assembly and the coils and support rings. This function of the resin-soaked felt coating 54 will be discussed in greater detail below.

Figure 4:
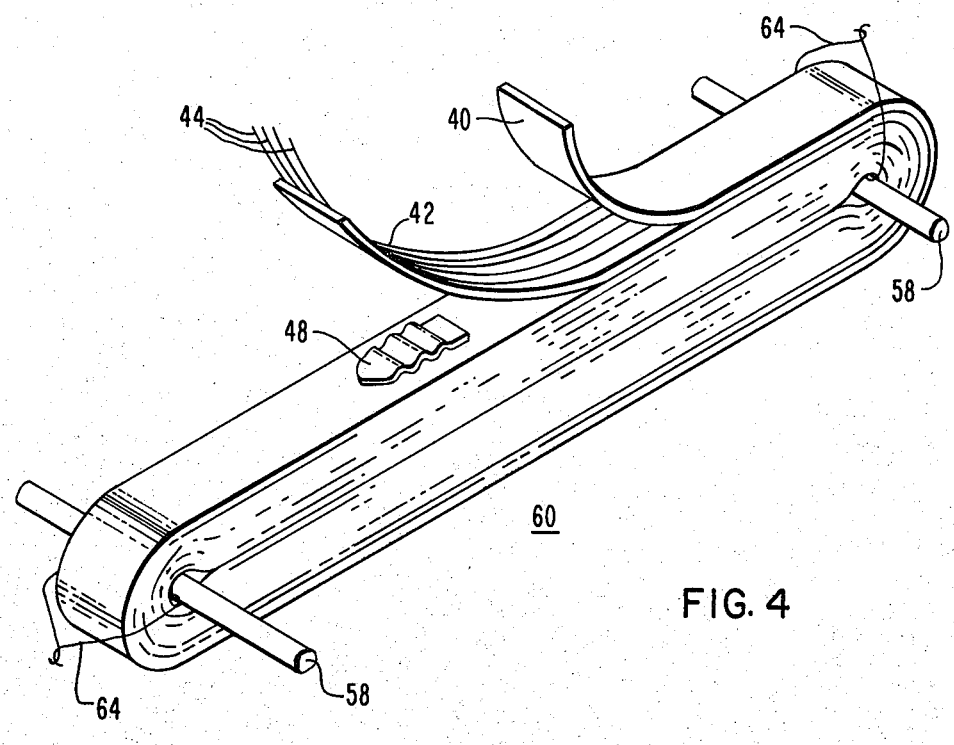
FIG. 4 depicts an exemplary method of forming the dry filament subcomposite of the present invention.

The dry filament subcomposite 60 described above is constructed before insertion into the hose. As shown in FIG. 4, layers of Dacron tape 42 with waxed glass cords 44 sewn thereto are alternately wound with layers of fiberglass sheet 40 around two pins 58. Periodically, during the winding operation, the ripple springs 48 are inserted into the subcomposite 60 structure. To maintain a generally uniform thickness of subcomposite 60, care should be taken to avoid locating any spring 48 directly above or below another spring 48.

The dry filament subcomposite 60 is finally prepared for insertion into the hose by tying each end of the subcomposite 60 with a suitably strong cord 64. The cord 64 can be drawn through the subcomposite 60 proximate a pin and tied to itself around the terminus of the wound subcomposite.

Figure 5:
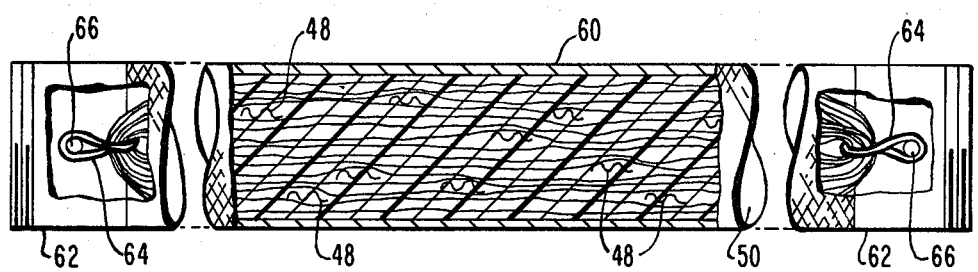
FIG. 5 is a sectional view of a hose of the present invention with the dry filament subcomposite inserted therein.

FIG. 5 depicts a hose 50 with the dry filament subcomposite 60 inserted therein. The hose 50 is equipped with metal fittings 62 at each end. Each metal fitting 62 has a pin 66 diametrically attached to its inside surface to which the fastening cord 64 can be tied. These cords 64 maintain the position of the subcomposite 60 relative to the hose 50 during the resin filling procedure. Following the insertion of the subcomposite 60 into the hose 50 and tying of the cords 64, the hose assembly is covered with the Dacron felt which is soaked with B-stage epoxy resin (not shown in FIG. 5). This Dacron felt coating is wrapped around the hose assembly in a spiral butt-lap manner.

Figure 6:
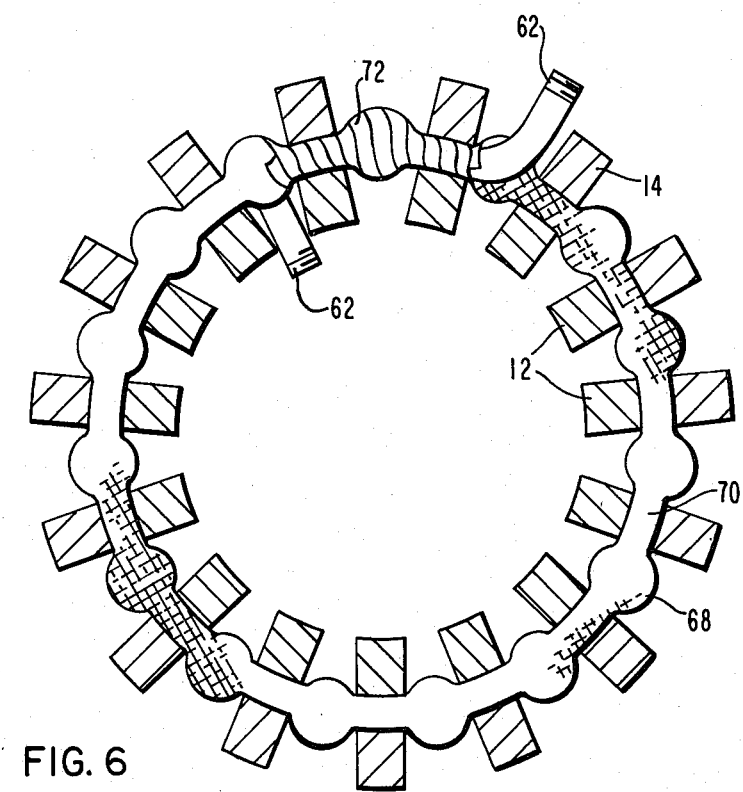
FIG. 6 depicts an exemplary arrangement of the present invention between two coaxial end winding assemblies.

FIG. 6 depicts the hose assembly of the present invention disposed between the top 12 and bottom 14 coil end windings of an exemplary turbine generator. Using the metal fittings 62 at each end of the hose assembly, resin is pumped into the hose under pressure through one fitting while a vacuum is drawn through the other fitting. As the hose is filled with the resin, the portions of the hose which are not in contact with either top 12 or bottom 14 coils tend to form bulges 68. The formation of these bulges 68 is aided by the outward forces exerted by the ripple springs (48 of FIGS. 2, 3, 4 and 5). In contrast, the portions of the hose assembly which lie between a top 12 and bottom 14 coil and are in contact with both coils tend to form a flattened cross-section 70. This flattened portion 70 assumes a cross-section resembling that of hose 37 of FIG. 1. This discontinuity of cross-sectional shape provides securement of the coils which prevents tangential motion while the radial pressure of the hose provides securement to the coils which prevents the top 12 and bottom 14 coils from motion toward each other.

As shown in FIG. 6, the hose is assembled with a suitable overlap which is secured with a banding of Dacron glass tape 72 which is impregnated with B-stage epoxy resin. This overlapped segment tends to assume a cross-sectional shape similar to hoses 33 and 34 of FIG. 1.

Although FIG. 6 depicts the hose of the present invention being disposed between the top 12 and bottom 14 coil assemblies, it should be apparent that the hose could also be disposed between a coil assembly and a support ring as depicted by hose 30 of FIG. 1.

Following the application of the Dacron felt coating (54 of FIG. 3) and prior to assembly of the hose into the generator, the B-stage epoxy resin with which the felt coating is impregnated becomes highly viscous. After assembly into the generator and during the curing of the resin, this B-stage resin becomes less viscous and highly adhesive. This decreased viscosity facilitates the forming of the bulges 68 shown in FIG. 6 and allows the hose to closely conform to the shape of objects it is in contact with while the increased adhesiveness forms a bond between those objects and the outside surface of the hose. Upon returning to room temperature, the resin-soaked Dacron felt cures to a rigid mass which adheres to the coils on support rings which it is in contact with.

Referring again to FIG. 1, it is apparent from the above discussion that, due to the difference of the coefficients of thermal expansion between regions A and B, the coefficients of thermal expansion of the hoses 31, 32 33, 34, 36, 37 and 38 must be preselected to match their respective adjacent coil sections. It should be obvious to one skilled in the art, from the description of the present invention, that this preselection of coefficients of thermal expansion is made possible by a suitable selection of ratios of dry filament subcomposite to resin, Dacron tape to fiberglass sheet and waxed glass cord to Dacron tape.

Although the present invention is described herein with a certain degree of specificity, both in structure and method of construction, it is to be understood that the present disclosure has been made only by way of example and that numerous changes in detail, combination and sequence of operation can be accomplished without departing from the spirit and scope of the present invention.

A securing method and apparatus has been herein disclosed that provides a means for securing stator coil end windings in a manner that allows the coefficient of thermal expansion of the embodiment of the present invention to be preselected with reasonable accuracy.

What we claim is:
1. A conductor securing apparatus comprising:
means for preventing a conductor from moving in a preselected direction, said preventing means being generally rigid;
a hose, said hose being generally flexible and being disposable between said conductor and said preventing means;

a resin, said resin being disposed within said hose;
a plurality of waxed glass cords, said plurality of waxed glass cords being disposed within said hose;
a plurality of fiberglass sheets, said plurality of fiberglass sheets being disposed within said hose;
a length of cross-weave tape, said length of cross-weave tape being disposed within said hose; and
said resin, cords, fiberglass sheets and cross-weave tape being combined in proportions which form a combination with said hose having a coefficient of thermal expansion generally equivalent to the coefficient of thermal expansion of said conductor.

2. The apparatus of claim 1, wherein said resin is heat curable.

3. The apparatus of claim 1, wherein said plurality of fiberglass sheets are porous, unidirectional fiberglass sheets.

4. The apparatus of claim 1, wherein said cross-weave tape has a coefficient of thermal expansion of approximately $25 \times 10^{-6}$ IN/IN/° C.

5. The apparatus of claim 1, wherein said generally rigid preventing means is a generally circular support ring.

6. The apparatus of claim 5, wherein said support ring is shaped to be disposed around an outside surface defined by a plurality of said conductors, said plurality of conductors being arranged radially symmetrically about a common axis.

7. The apparatus of claim 5, wherein said support ring is shaped to be disposed around an inside surface defined by a plurality of said conductors, said plurality of conductors being arranged radially symmetrically about a common axis.

8. The apparatus of claim 5, wherein said hose extends around the entire circumference of said support ring.

9. The apparatus of claim 8, wherein the ends of said hose are overlapped for a predetermined distance.

10. The apparatus of claim 2, wherein said resin is solidified by an application of heat.

11. The apparatus of claim 1, further comprising:
a ripple spring disposed within said hose.

12. A dynamoelectric machine with a stator coil end winding securing assembly, comprising:
a generally cylindrical stator structure;
an inner coil end winding assembly, said inner assembly comprising a plurality of conductors arranged in a generally conical shape, said inner assembly being generally coaxial with said stator structure;
an outer coil end winding assembly, said outer assembly comprising a plurality of conductors arranged in a generally conical shape, said outer assembly being coaxial with said inner assembly, said outer assembly being disposed radially outward from said inner assembly;
a plurality of support rings, each of said support rings being disposed proximate a preselected one of said inner and outer coil end winding assemblies;
a plurality of hoses, said hose being generally flexible, each of said hoses being disposed between a preselected one of said plurality of support rings and a preselected one of said inner and outer coil end assemblies;
a resin, said resin being disposed within each of said plurality of hoses;
a plurality of cords, said plurality of cords being disposed within each of said plurality of hoses;
a plurality of fiberglass sheets, said plurality of fiberglass sheets being disposed within each of said plurality of hoses;
a length of tape, said length of tape being disposed within each of said plurality of hoses; and
said resin, cords, fiberglass sheets and tape being combined in proportions within each of said plurality of hoses which form a combination with each of said plurality of hoses having a coefficient of thermal expansion generally equivalent to the coefficient of thermal expansion of said preselected one of said inner and outer coil assemblies.

13. The dynamoelectric machine of claim 12, wherein said resin is heat curable.

14. The dynamoelectric machine of claim 12, wherein said plurality of cords are waxed glass cords.

15. The dynamoelectric machine of claim 12, wherein said plurality of fiberglass sheets are porous unidirectional fiberglass sheets.

16. The dynamoelectric machine of claim 12, wherein said length of tape has a coefficient of thermal expansion of approximately $25 \times 10^{-6}$ IN/IN/° C.

17. The dynamoelectric machine of claim 12, wherein each of said plurality of hoses is formed into a generally circular shape with its ends overlapped for a predetermined distance.

18. The dynamoelectric machine of claim 12, wherein the cross-sectional shape of each of said plurality of hoses is more circular in the region between adjacent conductors than in the region immediately between each of said plurality of conductors and a preselected one of said plurality of support rings.

19. The dynamoelectric machine of claim 12, further comprising:
a ripple spring disposed within each of said plurality of hoses.

20. A method for securing a stator coil end winding, said method comprising;
disposing a support ring proximate said coil end winding;
sewing a plurality of waxed glass cords to a length of cross-weave tape;
combining said length of cross-weave tape with a plurality of fiberglass sheets to form a filament subcomposite;
inserting said filament subcomposite into a generally flexible hose;
securing each of the two ends of said filament subassembly to a different preselected end of said hose;
disposing said hose between said support ring and said coil end winding, said hose extending around the entire circumference of said support ring with the ends of said hose being overlapped for a predetermined distance;
filling said hose with curable resin;
curing said resin; and
said waxed glass cords, cross-weave tape, fiberglass sheets and resin being combined in proportions which form a combination with said generally flexible hose having a coefficient of thermal expansion generally equivalent to the coefficient of thermal expansion of said coil end winding.

21. The method of claim 20, further comprising coating the outer surface of said hose with a generally pliable adhesive material.

22. The method of claim 21, wherein said generally pliable adhesive substance is a felt material which is impregnated with a B-stage epoxy resin.

23. The method of claim 20, further comprising:
disposing a ripple spring within said filament subcomposite.

* * * * *